United States Patent [19]
Cording et al.

[11] Patent Number: 5,467,608
[45] Date of Patent: Nov. 21, 1995

[54] APPARATUS FOR COLLECTING A VOLATILE CONDENSATE AND FOR SEPARATING NON-CONDENSIBLE GAS THEREFROM

[75] Inventors: Louis B. Cording, Sønderborg; Hans B. Knudsen, Kolding; Asger Gramkow, Augustenborg, all of Denmark

[73] Assignee: A'Gramkow A/S, Sonderborg, Denmark

[21] Appl. No.: 321,468

[22] Filed: Oct. 11, 1994

Related U.S. Application Data

[63] Continuation of Ser. No. 970,920, Nov. 2, 1992, abandoned, which is a continuation of Ser. No. 762,009, Sep. 20, 1991, abandoned.

[30] Foreign Application Priority Data

Mar. 16, 1990 [DK] Denmark .................................. 684/90

[51] Int. Cl.⁶ ..................................................... F25B 43/04
[52] U.S. Cl. ................................. 62/195; 62/475; 62/126
[58] Field of Search ............................ 62/149, 195, 475, 62/125, 126, 129; 137/487.5, 457

[56] References Cited

U.S. PATENT DOCUMENTS

| | | | |
|---|---|---|---|
| 1,636,512 | 7/1927 | Hilger | 62/475 |
| 3,145,544 | 8/1964 | Weller | 62/475 |
| 5,005,369 | 4/1991 | Manz | 62/149 |

OTHER PUBLICATIONS

Althouse et al., Modern Refrigeration and Air Conditioning, 1968, pp. 70, 71, 141, 143, and 495.

*Primary Examiner*—John M. Sollecito
*Attorney, Agent, or Firm*—Antonelli, Terry, Stout & Kraus

[57] ABSTRACT

In systems or units for collecting volatile liquids, e.g. refrigerants from scrapped refrigeration systems, the liquid may be successively filled into a closed collector tank, inasfar as the vapor of the liquid as collected in the upper space of the tank will be condensed into the liquid as this rises in the tank. However, there will be separated also an amount of non-condensible gas, e.g. atmospheric air, that will cause a steadily increasing pressure in the tank, so that it is necessary to regularly effect a venting of the tank, that is a gas blow-off, by suitably controlling an upper blow-off valve on the tank. All according to the temperature such a blow-off, however, may be connected with a more or less pronounced and undesirable blow-off of the condensible gas, and the blow-off is minimized by a blow-off valve being controlled from a differential pressostat, which is influenced partly by the actual pressure in the collector tank and partly by the vapor pressure of from a confined volume of the liquid in its pure state. Thereby, the pressure contribution from the condensible gas in the tank, no matter the temperature, is compensated for, and thereby a more favorable controlling of the blow-off for minimizing the the undesired part of the blow-off product will be achieved.

12 Claims, 2 Drawing Sheets

APPARATUS FOR COLLECTING A VOLATILE CONDENSATE AND FOR SEPARATING NON-CONDENSIBLE GAS THEREFROM

This is a continuation of Ser. No. 970,920, filed Nov. 2, 1992, abandoned, which in turn is a continuation of application Ser. No. 07/762,009 filed Sep. 20, 1991, now abandoned.

FIELD OF THE INVENTION

The present invention relates to an apparatus for condensing a volatile liquid, for example a refrigerant, and collecting the condensate in a collector tank, with the apparatus comprising a condenser unit having an outlet connected to a collector tank, and a controllable gas exhaust valve, mounted at the top of the collector tank responsive to the pressure in the collector tank, for intermittently discharging non-condensible gas separated from the condensate.

BACKGROUND OF THE INVENTION

In systems for purifying and reclaiming of volatile liquids, in particular by emptying or renewal of old refrigeration systems, it is relevant to collect the volatile liquid, e.g. R-12, R-22 or R-134A, upon the liquid being brought from its gaseous phase into its liquid phase in a condenser, such that the collected liquid may be reused. In principle the condensate may be filled into the collector tank without the latter having to be vented, because the vapor or gas of the condensate in the upper tank space will maintain its gas pressure also when this space is narrowed by the progressive charging of liquid condensate into the tank. As the condensate rises in the tank the gas will diffuse or condense down into the liquid, such that the gas pressure above the liquid will remain constant when the temperature is constant. Normally, however, there will occur a certain separation of non-condensible gas, mainly of atmospheric air, and as the tank is filled this gas will give rise to an increased pressure in the tank, concurrently with a further pressure build-up due to the separation of non-condensible gas from the currently introduced condensate.

This increased pressure gives rise to some problems, for example an increase of the condensation pressure, whereby more energy is needed for the condensation of the volatile liquid, and, if the collector tank is to be utilized just reasonably effectively, that is to be widely filled for collecting reasonably large portions of the condensate, ready for delivery, then it is, in practice, imperative to carry out, from time to time, a blowing off or release of the non-condensible gas from the tank, and it is well known that this can be done based on the use of a pressure switch controlled blow-off or release valve at the top of the tank. Hereby a blowing off or release can be initiated automatically, when the pressure in the tank has risen to a predetermined maximum, and it can be interrupted when the pressure has decreased suitably, optionally controlled just by the hysteresis of the pressure switch.

However, the blowing off of the non-condensible gas gives rise to problems in that, along with the releasing or discharging of the non-condensible gases into the atmosphere, a certain amount of condensible gas will inevitably be discharged, and, as well known from an environmental point of view, a release of considerable amounts of refrigerant gas, mainly originating from the refrigerants R-12 and R-22, have a decomposing effect on the ozone layer around the planet. Such a discharge of the condensible gas is particularly noticeable when the temperature is relatively high, because the concentration or the pressure of the condensible gas will then be relatively high in the collector tank. This circumstance is made even worse by the fact that during the opening time of the blow-off or pressure relief valve the pressure in the collector tank will be reduced such that the condensate will evaporate further, whereby towards the end of the blow-off or release period, there will occur a further increased content of the condensible gas in the blow-off or discharged product.

A possible solution to this problem resides in the mounting of a cooler element in connection with a blow-out or discharge pipe from the collector tank, such that the exhausted or discharge gas will generally be cooled to the condensation temperature of the condensible gas, whereby the critical fraction of the gas is condensed and falls back into the tank without being released to the atmosphere. However, experiments have shown that, in practice, this solution is unrealistically expensive, if it shall be reasonably effective, since during the relatively brief blow-out or release periods, a particularly intensive heat exchange with the blow-out or released gases should take place.

In response to a similar type of problem in, for example DE-B2-25,15,605, a refrigeration system is proposed having means for separation of such air, which penetrates into the refrigerant during the operation, and which is currently separated in the condenser unit of the system. This unit is provided with a built-in, integrated control device for the blow-off or release valve and consists of a bellows mounted in a discharge duct from the condenser, with the condensate therefrom flowing further downwardly into an accumulation container. The accumulation container has a lower outlet for the condensate and and upper inlet for the gas to be condensed, and, in the container, there is mounted a float serving to close the outlet when the liquid level is low, while for a high liquid level the float will close the flow of condensate from the upper condenser chamber and therewith also close the feed of hot gas to the condenser, thereby providing for security in case of operational interruptions. The bellows is partly filled with the refrigerant as used in the entire system, whereby the bellows, through a rod, seeks to press a valve head into closing engagement with an upper blow-off or release opening for the gas, while the bellows, rigidly supported at its lower side, is inversely influenced to be compressed by the gas pressure existing in the condenser chamber. Thereby the blow-off or release valve will be opened when, in the condenser chamber, there is build up a noticeable overpressure originating from the partial pressure of the non-condensible gas, while the bellows will also serve the purpose of releasing or compensating for the partial pressure of the condensible gas, for example, by the inner pressure in the bellows, whereby the temperature dependence will be eliminated.

SUMMARY OF THE INVENTION

The invention is based on the consideration that at least the basic principle of the above proposal can be used with advantage in the connection relevant to the invention, although, in that connection, there are circumstances speaking against such use. In collector tanks in systems for purifying volatile liquids there will naturally occur a much heavier separation of impurities, including air, than in the current operation of a refrigeration system, and a result could be that the blow-off valve would adjust itself to a type of equilibrium, in which the release currently corresponds to the actual separation of air from the hot gas delivered to the condenser. Such a more or less permanent opening of the blow-off valve or release would not be advantageous, because the associated, undesired release of condensible gas would then be rather pronounced. It would be better if the blow-off can be arranged, during limited intervals of time, when the concentration of air in the gas filled partial volume of the tank is greater than an average value, as the total of co-blown-out co-released condensible gas would then be relatively smaller. Besides, in the discussed known proposal, it is problematic to transfer to a system of the type herein considered, because the control system should be mounted inside the space from which the blow-out or release takes place, for example, with high requirements as to a preadjustment according to the detailed operational conditions of the single system. By a series production of the systems or units in question, the detailed operational conditions of the single units cannot possibly be known, and this applies to liquid cleaning units still more than to refrigeration systems, since the cleaning units should be able to handle both more and less polluted liquids, while for refrigeration systems there will be certain standards for maximum pollution of the refrigerant.

According to the invention use is made of a collector tank as a separate unit, but of course flow connected with the condenser unit, such that the condensate is introduced into the collector tank for example, at the bottom thereof or, preferably, at a pipe mouth located at a relatively high level in the tank. For controlling the blow-off or release valve a differential pressostat is used, which is connected partly directly with the interior of the tank and partly with a limited amount of the actual liquid enclosed in a sensor pocket mounted in heat conducting connection with the tank or the contents thereof. With this arrangement, the differential pressostat will receive, on both connector stubs, the vapor pressure of the condensate liquid, and these applied pressures will balance each other out irrespectively of the level of the pressure 4, and therewith irrespectively of the temperature of the condensed liquid and its vapor. On one of the connector stubs there will additionally occur the pressure contribution from the separated air in the tank, and the release pressostat can be adjusted so as to open the valve by any desired value of this partial pressure. Moreover, the pressostat will be adjustable with respect to its hysteresis, such that the valve can be abruptly closed after a predetermined drop of the partial pressure in the tank, without being reopened until the partial pressure in the tank has again increased to the opening value.

The blow-off or release function will, in this manner, be controllable in a well defined and optimized way for each single system or apparatus unit, and the units may be produced as standard units without being preadjusted to special operational conditions. Moreover, the adjustment can be changed in a simple manner at any time, for example, for optimizing the unit to changed operational conditions such as the purification of more or less polluted liquids, respectively, which, for a full optimizing, may require a resetting of the pressure range or hysteresis of the pressostat.

BRIEF DESCRIPTION OF THE DRAWINGS

In the following the invention is explained in more detail with reference to the accompanying drawings, wherein.

DETAILED DESCRIPTION

Figure 1:
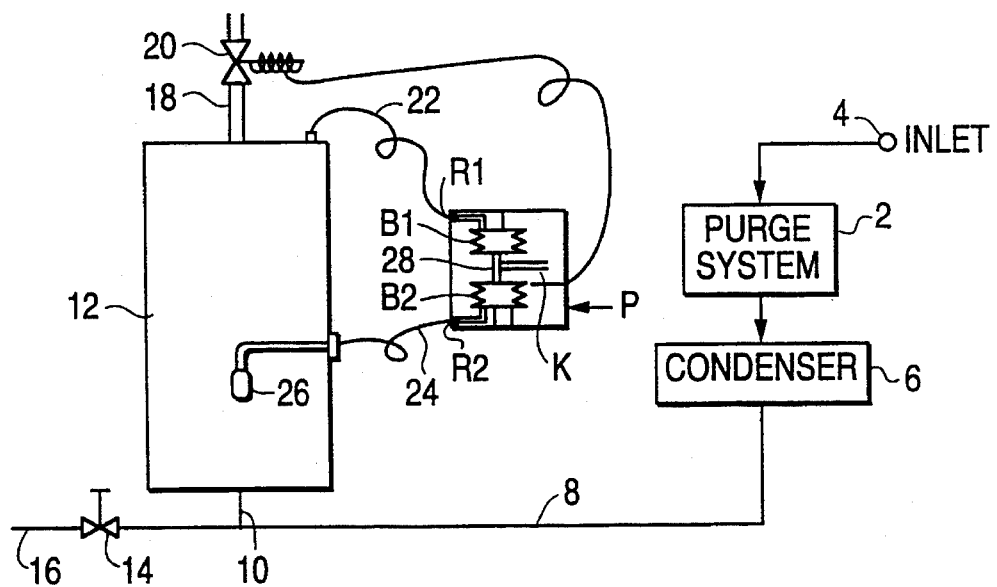
FIG. 1 is a schematic view of an apparatus constructed in accordance with the invention.

In FIG. 1 is indicated a purification system 2 for refrigerant supplied from a source 4, e.g. the refrigeration system of a car to be scrapped. In the purification system 2, the refrigerant will be cleaned for different substances, mainly water, but not for non-condensible gases, and the refrigerant, in a gaseous phase, is delivered to a condenser 6, from which the condensate is further conveyed through a conduit 8 to a connector stub 10 at the bottom of a collector tank 12. The bottom stub 10 is also, through a valve 14, connected with a discharge conduit 16.

At its top the collector tank 12 has a blow-out or release pipe 18 provided with a blow-off or release valve 20, for example, a solenoid valve controlled by a pressostat P constructed as a differential pressostat, which, through a switch K, controls the opening and closing of the blow-off or release valve 20 in dependence upon a pressure applied to a connector stub R1 being higher or lower than a pressure applied to another connector stub R2. Through a conduit 22, the connector stub R1 is connected directly with the space inside the tank, while the connector stub R2, through a conduit 24, is connected with a capsule 26 inside the collector tank 12.

The capsule 26 is filled with a liquid that is widely equivalent or identical with the condensate liquid in its pure condition, for example, one of the refrigerants R-12, R-22 or R-134A, and it will thus be the vapor pressure from this clean liquid that will be transferred to the input stub R2 of the pressostat P. To the stub R1 will be transferred the total pressure in the tank 12, i.e. the vapor or gas pressure both from the condensate in the tank at the same temperature and from the further pressure source constituted by the non-condensible gas and air as separated from the condensate, mainly atmospheric air. This air is compressed all according to the raising of the liquid level in the tank, so it will provide for a relatively increasing pressure on the input stub R1.

Inside the pressostat P the input stub R1 is connected to a bellows B1, which, through a rod 28, exerts a pressure on another bellows B2 connected to the stub R2. The switch K is controlled by the rod 28, such that the switch A will be closed and cause the blow-off or release valve 20 to open, when the overpressure from the separated air in the collector tank 12 reaches a certain, predetermined value. The pressostat exhibits a certain hysteresis, such that the blow-off or release valve 20 will not be closed until after a noticeable pressure drop in the collector tank 12 and, thereafter, will not be reopened until after a following noticeable increase of the pressure in the collector tank 12. Therefore, with a suitable adjustment of the pressostat P, it is possible to achieve discussed ideal conditions for the discussed blow-off or release of the air without any compromising blow-off or release of condensible gas. A certain associated blow-off of the condensible gas will be inevitable, but with a correctly adjusted system the amounts of released gas will negligible even according to strict criteria.

Figure 2:
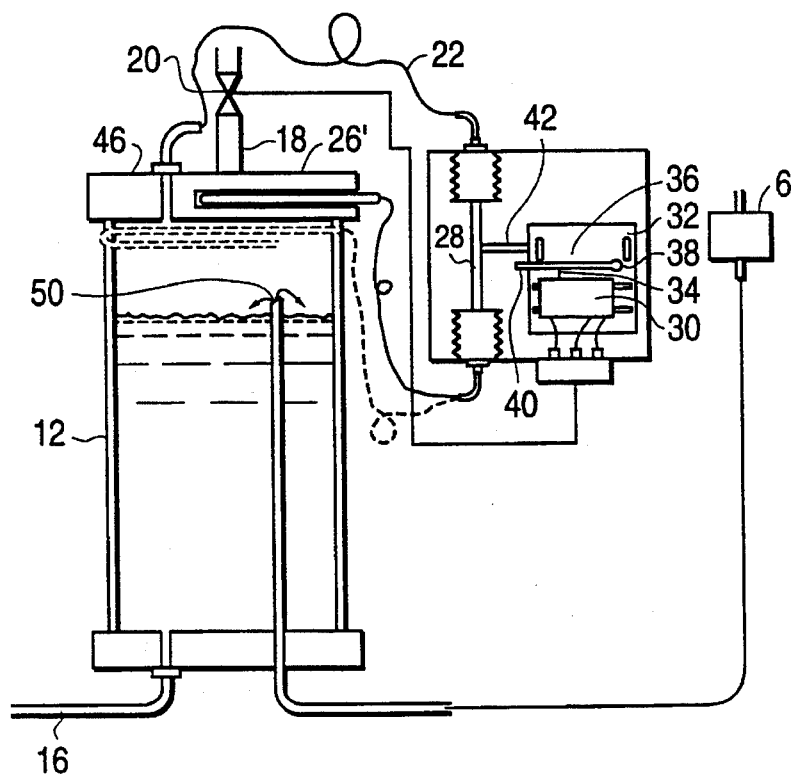
FIG. 2 is a schematic detail view of a preferred embodiment of an apparatus according to the invention.
Figure 4:
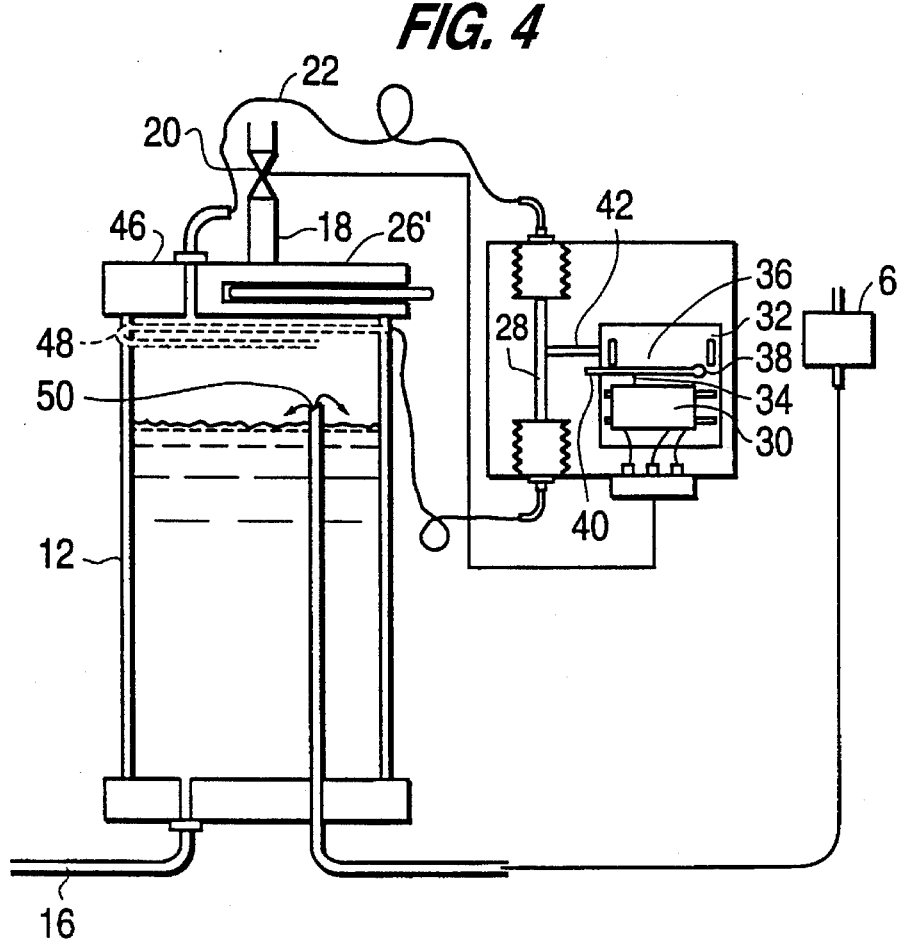
FIG. 4 is view like FIG. 2 except illustrating an alternate arrangement of the sensor capsule or pocket.

In the embodiment shown in FIG. 2 it is illustrated by way of example that the switch K is a micro switch 30, which is mounted on a carrier plate 32 and has an actuation knob 34 that is depressible for operating the switch by a pivot arm 36 hinged at 38 and having a free end portion 40, which is depressible by a side cam 42 on the connector rod 28 between the bellows B1 and B2. By an adjustment of the carrier plate 32 upwardly or downwardly it will then be possible to adjust the level of the differential pressure to which the pressostat responds, and, by adjusting the switch 30 horizontally on the carrier plate 32, an adjustment of the hysteresis function of the pressostat, given by the larger or smaller distance between the activation knob 34 and the pivot axis of the switch arm 36. Will be effected, Thus, the pressostat will be adjustable to different optimized manners of reaction. The capsule or pocket 26, which in FIG. 1 is, shown located inside the tank, is in FIG. 2, located in a bore in a tank head block 46 of aluminium or other such good heat conducting material, whereby this particular temperature/ pressure sensor will be in close contact, in a constructively simple manner, with the operatively significant area of the tank, for example, by the upper blow-off area, the temperature of which will be decisive for the blow-off or release pressure. Alternatively, as shown in FIG. 4, the sensor capsule or pocket 26 may be constituted by a capillary tube 48 wound about the upper end of the tank 12 in heat conducting connection therewith. The capillary tube 48 connections to the two input stubs of the pressostat should have approximately equal lengths.

The supply pipe for enabling the condensate into the tank 12, according to FIG. 2, may have an inlet or supply 50 located at a relatively high level in the collector tank 12 whereby the supplied liquid, during its introduction and following downfall enhances the possibilities for separation of air and other non-condensible gases to be subsequently blown off or released later on.

Suitably the tank is filled up to only some 80% of its volume, for example, as represented by the filling level shown in FIG. 2, with the supply or inlet 50 located slightly thereabove. By a still higher filling level there may tend to be an,increased concentration of condensible gas in the blow-off or release product.

It should be mentioned that the aim of mounting, as in FIG. 2, the sensor pocket 26' in indirect contact with with the tank chamber is to achieve that the sensor will not react to sudden brief temperature variations in the supplied condensate, but rather react to the present average temperature. With the use of the capillary tube 48 wound about the tank a heat insulation should be arranged at the outside.

Figure 3:
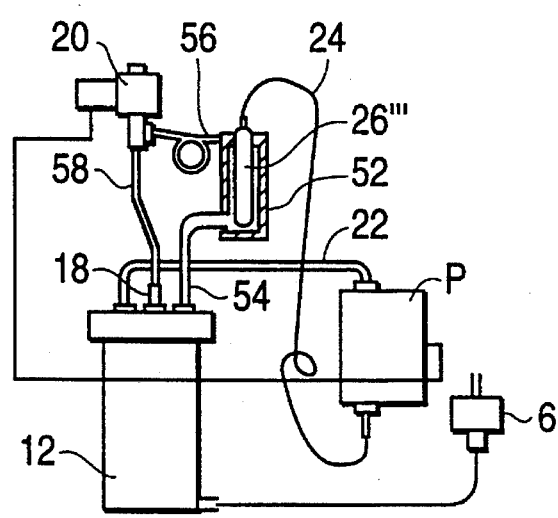
FIG. 3 is a partial cross-sectional view of a modified embodiment, and of the present invention.

FIG. 3 shows a modified system, including a condenser 6, pressostat P and collector tank 12 as in FIGS. 1–2. In the of FIG. 3 embodiment the sensor capsule 26''', is mounted externally of the collector tank 12, with the sensor capsule 26''' being accommodated in a housing 52. A lower end of the housing 52 of which is in constant communication with the top of the tank 12 through a pipe 54. The upper end of the housing 52 is connected to the inlet side of the blow-out or release valve 20 through a capillary pipe 56, which is thus connected to the blow-out or release valve 20 in parallel with the outlet stub 18 of the collector tank 12.

It is a significant aspect of the embodiment of FIG. 3 that the collector tank 12 is an easily exchangeable unit, which can be shifted or replaced whenever it is filled, while the housing 52 with the sensor 26''' can remain as a stationary unit in the reclaiming apparatus.

While the external arrangement of the housing 52 accounts for a less efficient temperature transfer between the tank 12 and the sensor 26''' within the housing 52, an advantage is realized in that they the Freon gases themselves are being heat-conductive, such that through the relatively wide pipe or hose 54 the temperature of the gas in the tank 12 will be transferred to the housing 52 and thus to the sensor 26'''.

Preferably, the housing 52 is made of a material having good heat conducting properties aluminum is such a material as noted above, such that the sensor 26''' is subjected to substantially the same temperature over an entire length thereof. The housing 52 may be externally heat insulated in order to promote this effect.

The capillary tube 56 between the top of the housing 52 and the inlet end of the blow-off or release valve 20 will result in a certain throughflow of the gas in the housing 52 every time the blow-off or release valve 20 is opened. Hereby the gas in the housing 52 will be replaced by "fresh gas" from the collector tank 12, whereby the temperature of the sensor 26''' will be adjusted accordingly. In typical cases such adjustments will take place with intervals of few minutes only, such that generally the temperature of the housing 52 and therewith of the sensor 26''' will be the same as the temperature in the upper end of the collector tank 12.

The conduit between the blow-off or release outlet stub 18 and the valve 20, provided as a capillary tube 58, will promote a slow and well controlled blowout of the gas.

Of course, all of the pipes or hoses communicating with the collector tank 12, including the pipe or hose 54, should be easily releasably arranged in order to enable the collector tank 12 to be easily shiftable.

As mentioned, the sensor pocket 26' should contain the same liquid as the condensate in its pure state, thus providing for the highest degree of optimizing of the blow-off or release function. This, however, will not exclude that a slightly deviating liquid be used, if according to experience it will provide for a result with a desired, sufficient degree of optimizing. Besides, with the embodiment according to FIG. 2 it will be relatively easy to readjust the device to the handling of another liquid, because the sensor pocket 26' and its connection to the pressostat will be easy to replace by a corresponding set containing the new liquid.

The invention, of course, will also comprise a system or unit, in which the blow-off or release valve 20 is controlled manually, when the pressostat is alternatively used for a suitable signalling, for example, by the switch K operating to control the operation of an indicator such as, for example, a signal lamp L.

We claim:

1. An apparatus for purging volatile liquids and collecting the purged liquid in a collector tank, the apparatus comprising:

an inlet for receiving volatile liquid;

a condenser unit in a delivery connection with the collector tank;

a purging system arranged in an in-line connection between said inlet and said condenser unit and operable to deliver purged liquid in a gaseous phase to said condenser;

a gas blow-off valve mounted in a blow-off conduit connected with a top of the collector tank, said gas blow-off valve being controllable in dependence upon condensate vapor pressure in the collector tank to effect an intermittent blow-off of non-condensible gas separated from the condensate, wherein the condenser unit is separately mounted from the collector tank, the gas blow-off valve is controllable by means for at least one of measuring or indicating a differential pressure between the actual condensate vapor pressure of the condensed liquid and a total gas pressure in the collector tank, said valve is adapted to be opened when a total pressure exceeds the condensate vapor pressure by a predetermined value, said means for measuring the condensate vapor pressure comprises a temperature responsive measuring container for holding a confined partial volume of at least one of the condensate or a liquid having substantially the same temperature/gas pressure characteristics as said condensate, and wherein said measuring container is mounted in a heat conducting connection with the top portion of the collector tank in such manner that said measuring container is operatively responsive to temperature changes in said top portion of the collector tank and therethrough only indirectly responsive to temperature changes of the infeed liquid to the collector tank.

2. An apparatus according to claim 1, wherein the measuring container includes a heat conducting component mounted in a heat conducting connection with one of the collector tank or contents thereof, said component being pipe connected with an external differential pressure gauge, which is additionally tube connected with the collector tank chamber itself, the differential pressure gauge forming at least a portion of a control unit for at least one of indicating a presence of non-condensible gas and controlling the blow-off valve between upper and lower limits for the differential pressure.

3. An apparatus according to claim 2, wherein the measuring container is mounted at the upper end of the collector tank.

4. An apparatus according to claim 2, wherein the external differential pressure gauge is adjustable with respect to upper and lower limits of the differential pressure.

5. An apparatus according to claim 2, wherein the measuring container is disposed externally of the collector tank, housed inside an enveloping housing, which is communicated in a heat conducting manner with the top portion of the collector tank.

6. An apparatus according to claim 5, wherein the measuring container is heat conductingly connected to the collector tank through a conduit detachably connected with the collector tank, and wherein all other conduits connected with the collector tank are detachably connected therewith such that the collector tank is easily exchangeable with another tank.

7. An apparatus according to claim 5, wherein said enveloping housing is fashioned of a heat conducting material.

8. An apparatus according to claim 5, wherein said enveloping housing is additionally connected with the inlet side of the blow-off valve.

9. An apparatus according to claim 1, wherein a blow-off connection between the collector tank and the atmosphere comprises the blow-off valve and a length of a capillary pipe.

10. An apparatus according to claim 2, wherein the measuring container is mounted at the upper end of the collector tank at an outside thereof.

11. An apparatus according to claim 2, wherein the measuring container is embedded in a head block provided on the collector tank, with the head block being made of a heat conducting material.

12. An apparatus according to claim 5, wherein the enveloping housing is connected to the inlet side of the blow-off valve through a capillary pipe.

* * * * *